Jan. 5, 1932.  F. J. RIKER  1,840,131
TESTING MACHINE
Filed Aug. 6, 1926   3 Sheets-Sheet 3

Inventor
FREDERICK J. RIKER
By J. King Harness
Attorney

Patented Jan. 5, 1932

1,840,131

UNITED STATES PATENT OFFICE

FREDERICK J. RIKER, OF DETROIT, MICHIGAN, ASSIGNOR TO CHRYSLER CORPORATION, OF DETROIT, MICHIGAN, A CORPORATION OF DELAWARE

TESTING MACHINE

Application filed August 6, 1926. Serial No. 127,557.

This invention relates to a testing machine and is illustrated as embodied in a testing machine for automobile bodies.

It is the primary object of my invention to provide a machine which will apply a torsional strain to the part to be tested, in order that any weak points may be located before it is put into use. From this point of view the invention contemplates applying vertical, reciprocating movement at a plurality of points, as for example by causing a pair of diagonally opposite supports to have upward movement while another pair have downward movement, thus applying a torsional strain on the part to be tested.

In the illustrated embodiment, an automobile body is secured at its four corners to reciprocating members adapted to transmit the torsional strain. The reciprocating members are shown driven by eccentrics, one pair mounted on a shaft at one end of a supporting frame and another pair mounted on a shaft at the opposite end of the supporting frame. Both shafts are driven by a motor centrally located.

Another object of my invention is to provide adjusting means to vary the amount of throw of each eccentric which will give any desired amount of movement.

Other objects and advantages will more fully appear from the following description and claims taken in connection with the accompanying drawings, in which:

Figure 1:
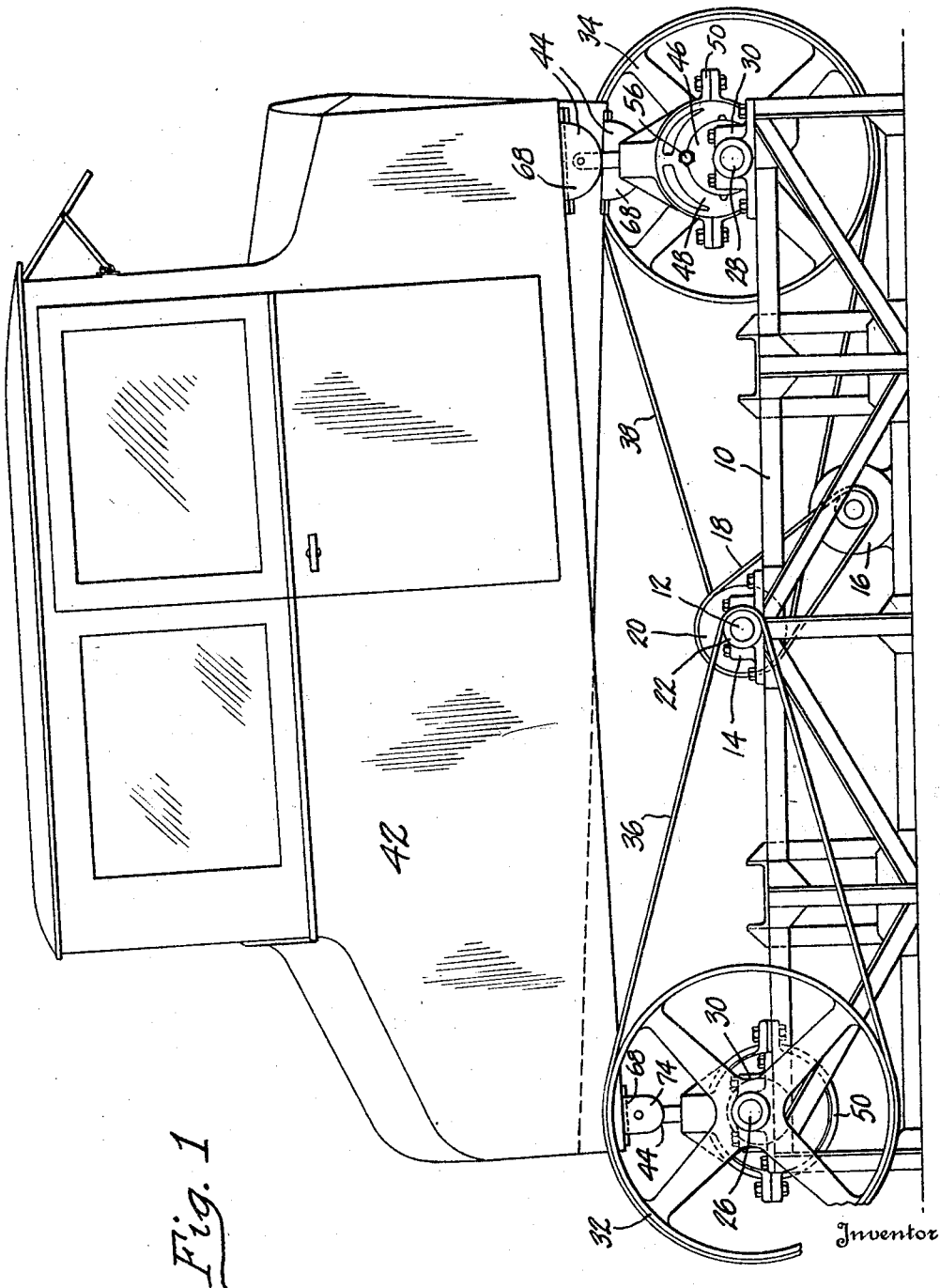
Fig. 1 is a side elevation of a machine constructed in accordance with my invention, showing an automobile body mounted thereon.

Referring now to the drawings the machine selected for illustration comprises a support or frame work 10, any convenient structure adapted to support driving and driven means. A central cross shaft 12, journaled in bearings 14 on the support 10, is driven by a motor 16 thru belt 18 and pulley 20. At the opposite ends of the shaft 12 are pulleys 22 and 24. At the opposite ends of the support 10 are cross shafts 26 and 28 journaled in bearings 30. At one end of each shaft and opposite to each other, are pulleys 32 and 34, driven by the pulleys 22 and 24 thru belts 36 and 38 respectively. Collars 40 are positioned on the shafts 12, 26 and 28 adjacent the bearings 14 and 30 to prevent axial movement thereof.

An automobile body 42 is secured to vertical supports 44 carried by the shafts 26 and 28. These supports are positioned on the shafts in such a manner as to be secured to the four corners of the body so that two supports are at the front of the body and two are at the rear of the body. It will be understood that a support on one side of the front two supports and a support on the opposite side of the rear two supports form diagonally opposite pairs.

Figures 4, 5:
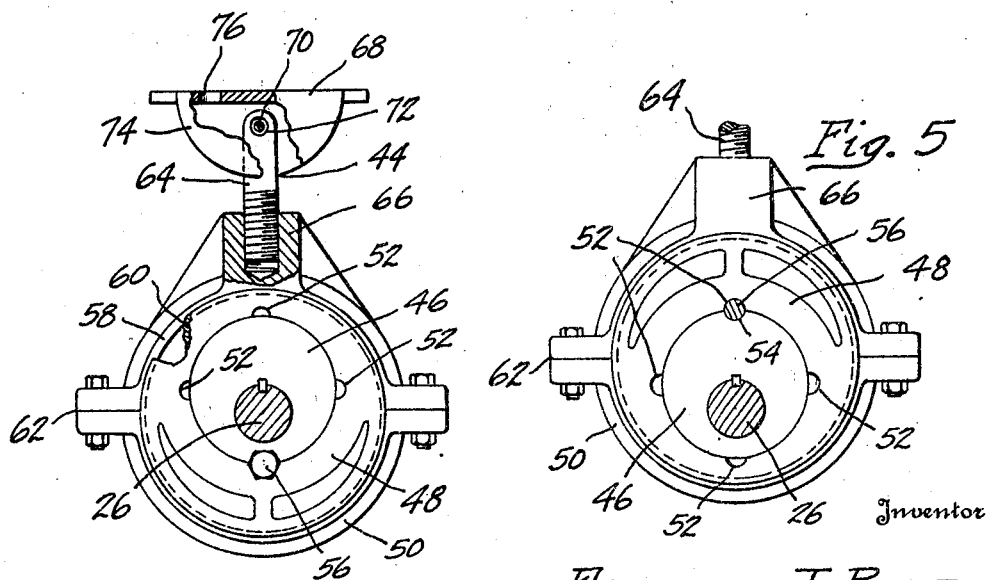
Fig. 4 is an enlarged view of one of the eccentrics and its support.
Fig. 5 is a view corresponding to Fig. 4 with eccentrics adjusted to another or extreme position.

Referring particularly to Figs. 4 and 5, one support has been shown in detail and for the purpose of description, only one hereinafter will be described, the same applying to all like supports.

An inner eccentric 46 is carried by the shaft 26 adapted to rotate therewith and an outer eccentric 48 is adapted to be secured in one of several positions with respect to the first mentioned eccentric. An outer bearing member 50, rotatably mounted on the outer eccentric 48, carries the support. The inner periphery of the outer eccentric 48 is provided with semi-circular apertures 52 and the outer periphery of the inner eccentric 46 is provided with one semi-circular aperture 54, which, when opposite one of the apertures 52, receives a bolt 56 acting as a key to secure the two eccentrics against relative rotation. By such an arrangement the two eccentrics may be positioned with respect to each other and the amount of throw varied. In the adjustment shown in Fig. 4 there is no throw and thus one point may be held stationary while the other eccentrics may be adjusted to a position as shown in Fig. 5 with the maximum throw. Any number of intermediate positions may be used to give any desired throw.

The outer bearing member 50 is provided with a tongue 58 fitting a groove 60 in the outer eccentric 48 to prevent axial movement with respect to each other. The bearing is shown split as at 62 for the purpose of assembly. A stud 64 is screw threaded in a boss 66, on the bearing 50, and carries a pivoted bracket 68. A pin 70 extending thru a tapered opening 72 is carried by two lateral flanges 74 of the bracket. The tapered opening 72 is to permit lateral tilting of the bracket as well as tilting in a plane at right angles thereto, and it is to be understood that any connection, such as to give a universal movement, may be used.

Figure 2:
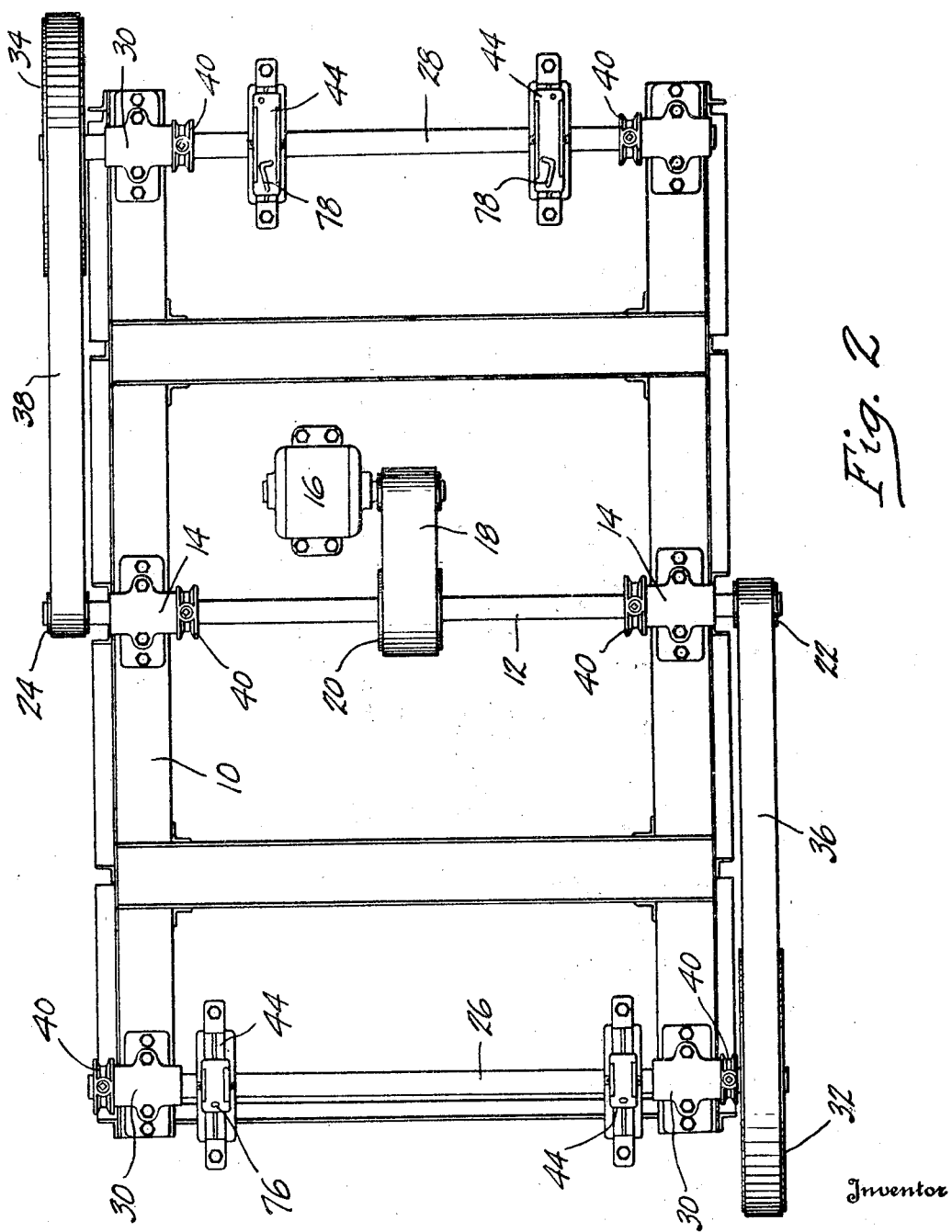
Fig. 2 is a plan view of Fig. 1 with the body removed.
Figure 3:
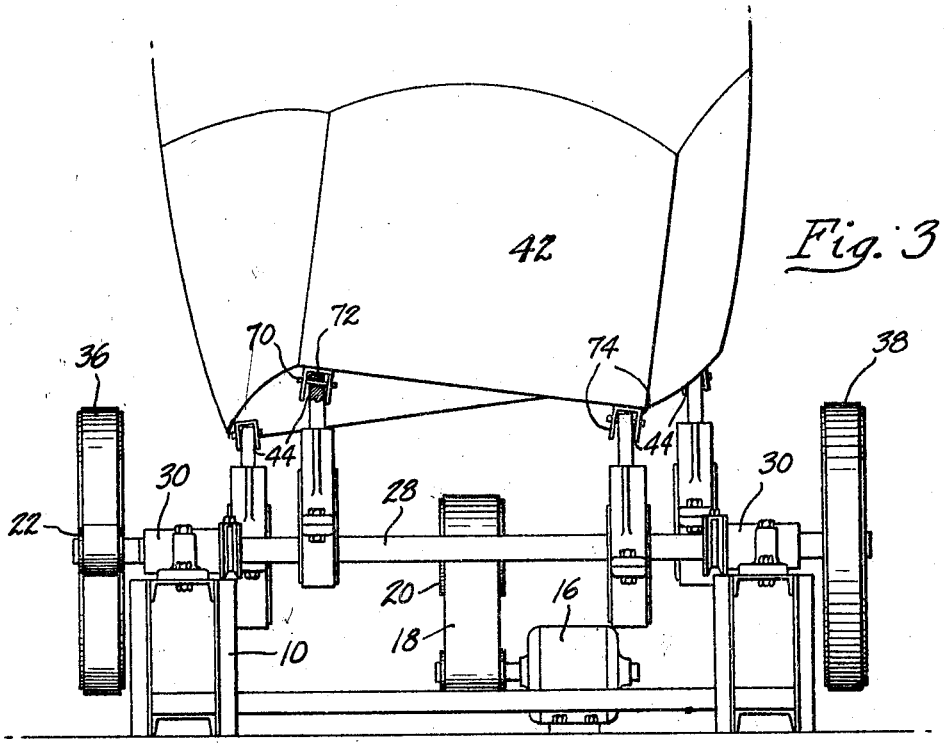
Fig. 3 is an end view of Fig. 1.

One corner of the body is secured to the bracket by any suitable securing means extending through the opening 76 in the top face of the bracket 68. The vertical position of the bracket may be adjusted by means of the screw threaded connection of the stud 64 with the boss 66. To compensate for any variation in the means for securing the brackets to the body, slots 78 may be substituted for the openings 76, as shown in Fig. 2.

Thus it will be understood that, with an automobile body mounted on the brackets and the latter positioned to move vertically to different heights, considerable twist is applied to the body. It is possible to exaggerate road conditions and if any weak points are in the body they will certainly yield when the machine is operating with the eccentrics set for extreme throw. With the independently adjustable eccentrics road conditions may be practically duplicated or certain portions of the body may be tested.

While the invention has been illustrated as one for testing bodies, various other constructions may be tested for torsional strains and it is not my intention to limit its scope other than by the terms of the appended claims.

What I claim is:

1. In a testing machine of the class described comprising reciprocating members adapted to be secured to several mis-aligned points of an object to be tested, means for reciprocating said members, and means for independently adjusting the amount of reciprocation of each member.

2. In a testing machine of the class described comprising reciprocating members arranged in diagonally opposite pairs, and means for reciprocating said members whereby one pair of diagonally opposite members reciprocate in opposition to the other pair of diagonally opposite members.

3. In a testing machine of the class described comprising reciprocating members arranged in diagonally opposite pairs, means for reciprocating said members whereby one pair of diagonally opposite members reciprocate in opposition to the other pair of diagonally opposite members, and means for independently adjusting the amount of reciprocation of each member.

4. A testing machine of the class described comprising a plurality of supports adapted to receive a part to be tested for torsional strain, a pair of eccentrics for reciprocating one of the supports, one eccentric having an eccentricity equal to that of the other, means for fixedly securing said eccentrics in one of several positions with respect to the other, and means for rotating said eccentrics.

5. In a machine of the class described comprising a pair of parallel shafts having a pair of eccentrics secured to each shaft, a pair of supports carried by each of said eccentrics, means for rotating said shafts, and means for independently adjusting the amount of reciprocation transmitted to each support by each eccentric.

6. In a testing machine of the class described comprising a support, driven eccentric members in at least two different vertical planes on said support, members reciprocated by said driven eccentric members, and means for independently adjusting the amount of reciprocation of said members.

7. In a testing machine of the class described comprising a pair of laterally spaced supports, a pair of driven members on each support, one driven member at the opposite ends of each support, and reciprocating members carried by said driven members, said members diagonally opposite being reciprocated in opposition to other members diagonally opposite.

8. In a testing machine of the class described comprising a support, a central cross shaft, a cross shaft at each of the opposite ends of said support, driving connections between the central shaft and the end shafts, reciprocating members on each of said end shafts, eccentrics on said end shafts for reciprocating said members in diagonally opposite pairs, and means for driving said central shaft.

9. In a testing machine of the class described comprising a support, a central cross shaft, a cross shaft at each of the opposite ends of said support, driving connections between the central shaft and the end shafts, reciprocating members on each of said end shafts, eccentrics forming a driving connection between said shafts and said reciprocating members arranged to cause one pair of diagonally opposite members to be reciprocated in opposition to the other pair of diagonally opposite members, and means for independently adjusting the amount of reciprocation of each member.

10. A testing device comprising attaching means for forming a fixed connection to an object to be tested at three or more points, and means for moving the attaching means, with certain ones moving in opposition to others, whereby torsional strain may be imposed upon the object.

11. A testing device comprising means for forming a fixed connection to an object to be tested at three or more points, and means for exerting force on the object at the connecting points, certain of said points being moved in opposition to others, whereby torsional strain may be imposed upon the object.

FREDERICK J. RIKER.